US008874763B2

(12) United States Patent
Ehrlich et al.

(10) Patent No.: US 8,874,763 B2
(45) Date of Patent: Oct. 28, 2014

(54) METHODS, DEVICES AND COMPUTER PROGRAM PRODUCTS FOR ACTIONABLE ALERTING OF MALEVOLENT NETWORK ADDRESSES BASED ON GENERALIZED TRAFFIC ANOMALY ANALYSIS OF IP ADDRESS AGGREGATES

(75) Inventors: Willa Ehrlich, Highland Park, NJ (US); Ratna Chakka, Fairfax, VA (US); Eric Fermon, Bothell, WA (US); David Hoeflin, Middletown, NJ (US); Manuel Ortiz, Easton, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 567 days.

(21) Appl. No.: 12/940,432

(22) Filed: Nov. 5, 2010

(65) Prior Publication Data
US 2012/0117254 A1    May 10, 2012

(51) Int. Cl.
*G06F 15/16* (2006.01)
*H04L 29/06* (2006.01)
*H04L 12/24* (2006.01)

(52) U.S. Cl.
CPC .......... *H04L 41/142* (2013.01); *H04L 63/1425* (2013.01); *H04L 63/1408* (2013.01); *H04L 63/14* (2013.01); *H04L 63/1458* (2013.01); *H04L 63/1475* (2013.01)
USPC ........................................................ 709/228

(58) Field of Classification Search
CPC ............ H04L 63/1425; H04L 63/1475; H04L 63/1458; H04L 63/14; H04L 63/1408
USPC ........................................................ 709/228
See application file for complete search history.

(56) References Cited

U.S. PATENT DOCUMENTS

| | | | |
|---|---|---|---|
| 6,981,146 B1* | 12/2005 | Sheymov | 713/172 |
| 7,409,716 B2* | 8/2008 | Barnett et al. | 726/23 |
| 7,500,266 B1* | 3/2009 | Vukelich et al. | 726/23 |
| 7,823,202 B1* | 10/2010 | Nucci et al. | 726/22 |
| 8,028,337 B1* | 9/2011 | Xu et al. | 726/23 |
| 2003/0145232 A1* | 7/2003 | Poletto et al. | 713/201 |
| 2005/0111367 A1* | 5/2005 | Jonathan Chao et al. | 370/235 |
| 2005/0132060 A1* | 6/2005 | Mo et al. | 709/227 |
| 2006/0242706 A1* | 10/2006 | Ross | 726/23 |
| 2007/0005297 A1* | 1/2007 | Beresniewicz et al. | 702/181 |
| 2007/0150949 A1* | 6/2007 | Futamura et al. | 726/22 |
| 2007/0245420 A1* | 10/2007 | Yong et al. | 726/23 |
| 2008/0133540 A1* | 6/2008 | Hubbard et al. | 707/10 |
| 2008/0198756 A1* | 8/2008 | Croak et al. | 370/250 |
| 2010/0138919 A1* | 6/2010 | Peng et al. | 726/22 |
| 2010/0235915 A1* | 9/2010 | Memon et al. | 726/23 |

\* cited by examiner

*Primary Examiner* — Yves Dalencourt
*Assistant Examiner* — Blake Rubin
(74) *Attorney, Agent, or Firm* — Myers Bigel Sibley & Sajovec (57) ABSTRACT

Methods for providing alerts in a network are disclosed. Some methods include collecting network traffic data corresponding to multiple subsets of network addresses during a predefined time interval. A suspect subset of the subsets of network addresses that corresponds to anomalous network activity may be identified based on the network traffic data and using at least one of multiple anomaly detection metrics. A source network address within the suspect subset of network addresses that corresponds to the anomalous network activity is identified. An alert corresponding to the source network address may be generated.

16 Claims, 7 Drawing Sheets

METHODS, DEVICES AND COMPUTER PROGRAM PRODUCTS FOR ACTIONABLE ALERTING OF MALEVOLENT NETWORK ADDRESSES BASED ON GENERALIZED TRAFFIC ANOMALY ANALYSIS OF IP ADDRESS AGGREGATES

BACKGROUND

The present disclosure relates to methods and computer program products related to networks and, more particularly, to regulating computer networks.

As the cost of computing devices has diminished, computers and computer networks have grown increasingly prevalent in use. One example of a network includes the Internet, which has become a common resource for many people and businesses. For example, many households now have personal computers that are connected to the Internet via a high speed service such as, for example, a broadband service.

Although the Internet may provide many services to household users, such uses may expose the users to unscrupulous online entities. Such entities may create security risks to the users and the networks through which users interconnect.

SUMMARY

It should be appreciated that this summary is provided to introduce a selection of concepts in a simplified form, the concepts being further described below in the Detailed Description.

It should be appreciated that this summary is provided to introduce a selection of concepts in a simplified form, the concepts being further described below in the Detailed Description. This summary is not intended to identify key features or essential features of this disclosure, nor is it intended to limit the scope of the invention. Some embodiments disclosed herein include methods for providing alerts in a network. Such methods may include collecting network traffic data corresponding to a plurality of subsets of network addresses during a predefined time interval, identifying a suspect subset of the subsets of network addresses that corresponds to anomalous network activity based on the network traffic data and using at least one of a plurality of anomaly detection metrics and identifying a source network address within the suspect subset of network addresses that corresponds to the anomalous network activity.

In some embodiments, the anomaly detection metrics include at least one network traffic volume data metric in the predefined time interval, a standardized entropy of a distribution of traffic share of the plurality of subsets of network addresses in the predefined time interval, and a relative entropy of a distribution of traffic share of the plurality of subsets of network addresses in the predefined time interval relative to a baseline distribution of traffic share of respective ones of the plurality of subsets of network addresses.

Some embodiments provide that identifying the suspect subset that corresponds to anomalous network activity using the at least one network traffic volume data metric includes determining a network traffic volume data metric value from ones of the subsets of network addresses and identifying the suspect subset as having the network traffic volume data metric value that exceeds a predicted network traffic volume data metric value. In some embodiments, the network traffic volume data metric includes a metric selected from a group of metrics including dropped connections, network traffic flows, bytes of network traffic, packets of network traffic and established connections.

In some embodiments, identifying the suspect subset of subsets of network addresses that corresponds to anomalous network activity using the standardized entropy of the distribution of traffic share includes determining a standardized entropy of at least one of a multiple traffic metrics that provides a standardized entropy value corresponding to the subsets of network addresses, the standardized entropy value corresponding to a probability that the anomalous network activity is initiated by one of the subsets. Some embodiments provide that the standardized entropy value includes a value in a range from 0 to 1 that corresponds to an increasing probability that one of the plurality of subsets of network addresses initiated the anomalous network activity as the standardized entropy values decreases.

In some embodiments, identifying the suspect subset of subsets of network addresses that corresponds to anomalous network activity using the relative entropy of the distribution of traffic share includes determining a relative entropy of at least one of a plurality of network traffic metrics that provides a relative entropy value corresponding to the subsets of network addresses, the relative entropy value corresponding to a probability that the anomalous network activity is initiated by one of the subsets.

Some embodiments provide that the relative entropy value includes a relative entropy of distributions of traffic share between a current probability distribution observed in a recently measured time interval and a baseline probability distribution that corresponds to a probability that one of the subsets of network addresses initiated the anomalous network activity. In some embodiments, as the relative entropy value increases, a probability that one of the subsets of network addresses initiated the anomalous network activity increases.

In some embodiments, identifying the suspect subset of subsets of network addresses includes determining a total network traffic volume in the predefined time interval, determining a standardized entropy of a distribution of traffic share of the subsets of network addresses in the predefined time interval, and determining a relative entropy of a distribution of traffic share of the subsets of network addresses in the predefined time interval relative to a baseline distribution of traffic share of the subsets of network addresses.

Some embodiments provide that identifying the suspect subset of the subsets of network addresses includes comparing determined values corresponding to the total network traffic volume, the standardized entropy and the relative entropy to baseline values of the total network traffic volume, the standardized entropy and the relative entropy to determine a total volume deviation score, a standardized entropy deviation score and a relative entropy deviation score. In some embodiments, identifying the suspect subset of the subsets of network addresses includes determining a statistical significance corresponding to each of the total volume deviation score, the standardized entropy deviation score and the relative entropy deviation score for the plurality of subsets of network addresses and generating an alert corresponding to the subsets of network addresses responsive to determining that any of the total volume deviation score, the standardized entropy deviation score or the relative entropy deviation score is statistically significant.

In some embodiments, generating the alert corresponding to the suspect subset of network addresses include analyzing the subsets of network addresses using an odds ratio test to determine the suspect subset of network addresses having a current network traffic share that is greater than a baseline network traffic share.

Some embodiments provide that identifying the source network address within the suspect subset of network addresses includes selecting source network addresses using entropy-based clustering procedures based on the source network address flow share being greater than a flow share threshold value. In some embodiments, selecting source network addresses using entropy-based clustering procedures includes iteratively selecting source network addresses and reducing the flow share threshold value by an exponentially decreasing factor following each iteration.

Some embodiments provide that identifying the source network address within the suspect subset of network addresses includes analyzing distributions of flow traffic volume based on traffic flow volume quartiles. Some embodiments provide that the network traffic data includes traffic volume, dropped network connections, passed through connections or network device related events.

In some embodiments, the subsets of network addresses are mutually exclusive subsets that include at least one first size subset and at least one second size subset that is different from the first size subset.

Some embodiments of the present invention include computer program products for providing alerts in a network, the computer program product comprising a computer-readable medium having computer-readable program code executable by the server. The computer-readable program code is configured to perform operations according to embodiments as described herein.

Other methods and/or computer program products according to embodiments described herein will be or become apparent to one with skill in the art upon review of the following drawings and detailed description. It is intended that all such additional methods and/or computer program products be included within this description, be within the scope as described herein, and be protected by the accompanying claims.

DETAILED DESCRIPTION OF EXEMPLARY EMBODIMENTS

As described herein, systems and methods for detecting malevolent network addresses based on generalized traffic anomaly detection algorithms applied to network traffic flow-type data are provided. Net-flow type data collected on IP traffic traversing a given network can be analyzed with respect to several different types of network anomalies. Such anomalies may include a network element failure event (e.g., router outage) or temporary network mis-configuration, a change in network configuration/network infra-structure (e.g., new prefix advertised), an Internet intrusion event such as Denial of Service (DoS) attack or scanning associated with a worm propagation, a flash flood (flash crowd) event (e.g., increase in traffic to a set of servers following a new software release, and/or other types of anomalies not associated with network infrastructure change or internet security intrusion (e.g., a host participating in a (legitimate) bulk transfer with another host). Consequently, time series of network traffic characteristics such as traffic volume or flow distribution size may be useful for anomaly detection.

An Internet security analyst may be typically interested in Internet intrusion events such as Denial of Service (DoS) attacks or scanning associated with a worm propagation that tend to be short-term aberrations (i.e., minutes or hours) as opposed to long-term trends (weeks or months) associated with network evolution within a dynamic environment. Furthermore, if the specific IP address (or IP addresses) within an internal network responsible for initiating the DoS or worm propagation attack can be identified, then an internet security analyst can flag these IP addresses so that remediation can be performed on these host machines. Consequently, network anomaly detection techniques that are not reliant on pre-defined protocol packet signatures and that permit efficient and accurate identification of malevolent IP hosts may be of especial interest to Internet security network analysts.

Several methods used to identify network anomalies may be given as a time series analysis of network behavior. Such methods include volumetric and information-theoretic approaches. For example, one such volumetric approach applies the Holt-Winters forecasting algorithm to a time series of traffic counts. outgoing bandwidth rate (Mbps) of a router interface link. The algorithm assumes that an observed time series can be decomposed into an overall mean component, a linear trend and a seasonality effect. These components may be updated using exponential weighted moving average (EWMA) or exponential smoothing, following each time period by a (weighted) average of the component's estimate obtained solely from the current observed value and the component's current predicted value (based on older observations). If $y_t$ is the observed measurement at time t, $\hat{y}_t$ is the predicted or expected value at time t, then a deviation measure may be applied to $y_t$ and $\hat{y}_t$. An anomaly may be detected by determining whether an observed measurement falls outside the upper confidence band for time period t.

Information-theoretic methods for detecting network traffic anomalies may provide analysis of traffic feature distributions with the rationale that many important kinds of internet intrusions will cause changes in the distribution of IP addresses and ports observed in network traffic. Thus, during some internet intrusions, feature distributions may become more dispersed, as when source addresses are spoofed during a spoofed Denial of Service (DoS) attack or when multiple ports are scanned for vulnerabilities during a port scan. For other internet intrusions, however, feature distributions may become concentrated around a small set of values, as when a single source IP sends out an unusually high volume of network traffic to a single destination port during a worm propagation.

Applying an entropy information-theoretic metric to distributions of IP addresses and ports obtained from flow traces, feature analysis may enable detection of a wide class of anomalies that are not detectable via volumetric metrics (especially if they generate very little additional traffic volume) with the implication that volumetric and entropy measures are complementary.

Some methods for detecting Internet intrusions may be based on some change in IP address structure (as opposed to a network traffic overload condition.) For example, in the case of worm propagations, the destination IP address structure may shift in that a much broader range of destination IP address aggregates are contacted as compared to pre-propagation time periods.

Although volumetric and feature distribution analysis of network traffic values may reveal the presences of Internet intrusion events, identifying which anomalies correspond to malevolent IP addresses to report on internally infected IP addresses may be beneficial.

As used herein, network addresses may be IP addresses and network traffic flow-type data may be Internet traffic flow-type data. For example, network traffic may be analyzed with respect to number of connections, packets and/or bytes between a source and destination network address. The network addresses may be routable and/or non-routable addresses that may reside within one or more private networks. The network traffic counts can be generated by various devices including, for example, firewalls, intrusion detection/intrusion prevention appliances, web proxy servers and routers, among others. Network traffic counts may be further characterized in terms of whether the connections, bytes and/or packets are dropped by the devices or whether they are passed through the respective devices.

As used herein, generalized traffic anomaly detection refers to application of both volumetric and information-theoretic metrics to traffic data in the absence of utilizing pre-defined signatures for identifying attacks, spyware, etc. In some embodiments, for a given time period, if a (seasonality adjusted) metric crosses a confidence band computed for its expected value, a threshold-crossing alert is generated and then the specific comprised IP hosts are attempted to be identified. Thus, some embodiments provide that the IP address aggregates whose initiated traffic share is significantly greater than its baseline traffic share are identified. In some embodiments, additional algorithms (e.g., entropy-based cluster extraction; quartile analysis, etc,) may be applied to the traffic data associated with these IP-address-aggregates to identify IP "heavy-hitters."

Although both a volumetric and feature distribution analysis of network traffic data can reveal the presence of a wide range of Internet intrusion events, from the point of view of an Internet security analyst, certain anomalies may be of more interest than others. For example, in a spoofed DoS event which causes a dispersion in the distribution of source IP addresses, the source IP addresses may not be veridical and hence cannot be cleansed of their malware. In this regard, this type of Internet intrusion anomaly might be of lesser concern regarding internally infected IP addresses for remediation.

There are several issues relevant to network traffic anomaly detection that may be addressed herein. First, seasonally adjusted expected values may be applied when computing volumetric and/or entropy deviation scores. Second, since a combined volumetric and entropy-related approach is applied to anomaly detection, an increase in the number of different types of anomalies that can be detected may be realized. Third, given the objective of actionable alerting on infected IP hosts, a two-step approach of applying algorithms to initially identify IP address aggregates whose current traffic share is significantly higher than its baseline traffic share and then uncovering these IP address aggregate "heavy hitters" may be very efficient. This is because the number of IP address aggregate baseline traffic share parameters that we need to persist is smaller than the number of IP address baseline traffic share parameters. Finally, computation of entropy on a distribution of IP address aggregate traffic share may be beneficial relative to computing such a metric on a traffic share distribution of IP addresses. For example, grouping IP addresses into mutually exclusive and exhaustive IP address aggregates may be prudent for scalability reasons. Some embodiments provide that the address aggregates may be substantially similar in size or substantially different in size. In addition, the entropy calculation need not be adjusted as active IP hosts are added or subtracted.

Figure 1:
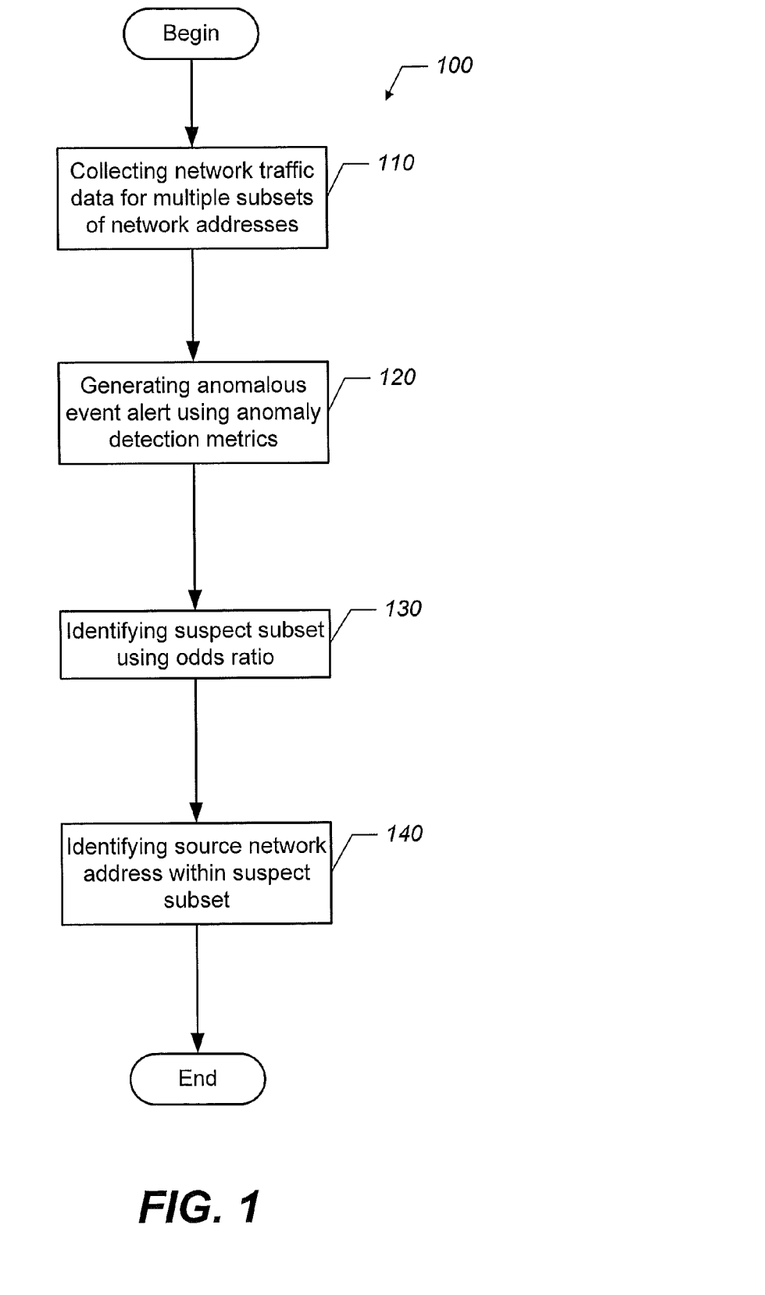
FIG. 1 is a flowchart of operations for providing alerts in a network according to some embodiments described herein.

Reference is now made to FIG. 1, which is a flowchart of operations for providing alerts in a network according to some embodiments described herein. Network traffic data corresponding to multiple subsets of network addresses may be collected during a predefined time interval (block 110). In some embodiments, the network traffic data may include traffic volume, dropped network connections, and/or firewall events, among others. Some embodiments described herein may use multiple generalized traffic anomaly metrics including, for example, traffic volume, such as number of flows, bytes, packets, and/or connections departing a network for a specified interval of time.

Some embodiments provide that the subsets of network addresses are mutually exclusive subsets and may include subsets defined in any of a variety of ways. Additionally, the subsets of network addresses may be exhaustive such that each address in the network is a member of a subset. Subsets may include a variety of network address quantities relative to one another. As described herein, exemplary subsets may include and may be referred to as Internet Protocol (IP) address aggregates and/or zones. Some embodiments provide that the network addresses are IP addresses that may or may not correspond to public or publicly known IP addresses. In some embodiments, the IP address aggregates may be determined by using a mask that would aggregate sets of IP addresses.

Some embodiments provide that the time interval may be hourly, but the disclosure is not so limited. For example, within the scope and spirit herein, the time interval over which data is collected may defined as multiple hours and/or fractions of hours, or other suitable time units (weeks, days, minutes, seconds, etc.)

Operations may include generating an anomalous event alert using anomaly detection metrics (block 120). The alert generation may be based on the network traffic data and may be determined using at least one of multiple anomaly detection metrics that are operable to generate an alert that indicates the presence of anomalous network activity among the subsets of network addresses. Some embodiments provide that anomaly detection metrics include a total network traffic volume in the predefined time interval, a standardized entropy of a distribution of traffic share of the subsets of network addresses in the predefined time interval, and a relative entropy of a distribution of traffic share of the subsets of network addresses in the predefined time interval.

Figure 2:
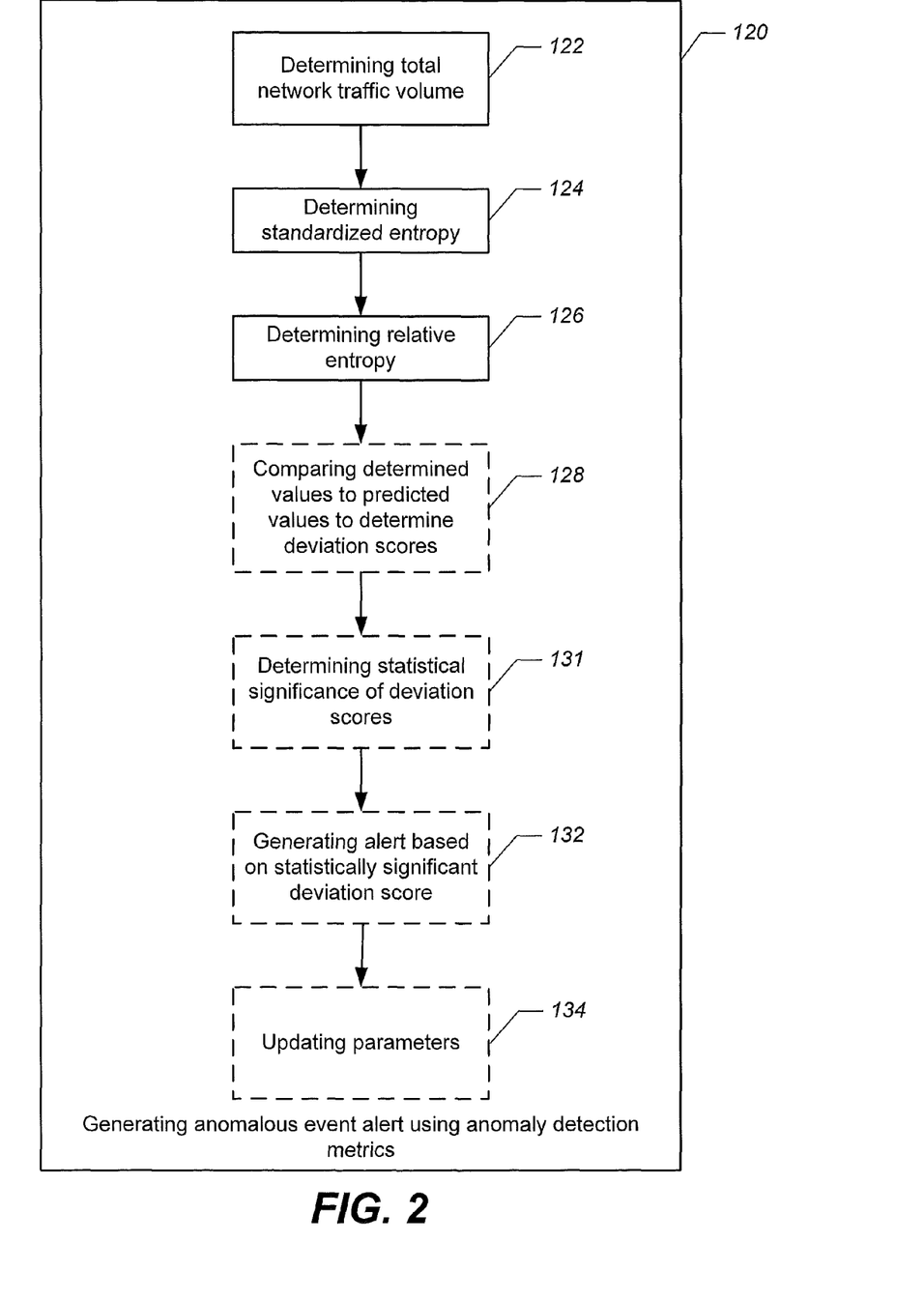
FIG. 2 is a block diagram of operations for generating an anomalous event alert in a network according to some embodiments described herein.

For example, reference is now made to FIG. 2, which is a block diagram of operations for generating an anomalous event alert using the anomaly detection metrics in a network. Operations may include determining the total network traffic volume (block 122). In some embodiments, determining the total traffic volume may include determining a total volume of dropped connections from the subsets of network addresses. In some embodiments, the suspect subset may be identified as having a higher volume of dropped calls than a predicted volume of dropped calls. An alert may be generated, for example, if a volume deviation score is exceeded.

Some embodiments may include determining standardized entropy as a metric for generating an alert regarding the anomalous network activity corresponding to a suspect subset (block 124). For example, a standardized entropy of the distribution of traffic share may be determined for one or more of network traffic metrics and may generate standardized entropy values corresponding to the subsets of network addresses. Some embodiments provide that each of the standardized entropy values corresponds to a probability that the anomalous network activity is initiated by one of the subsets.

For example, some embodiments determine the standardized entropy of distribution of subset traffic share. For example, where X is a random variable that takes on $N_X$ discrete values and, for a given interval of time, a random sample of X is taken or observed for m times, $P(x_i)=m_i/m$, $x_i \in X$, where $m_i$ is the frequency of X taking the value $x_i$. The standardized entropy of a discrete random variable X is defined as:

$$H_s(X) = \frac{-\sum_{x_i \in X} p(x_i) \log p(x_i)}{\log(\min(N_X, m))}$$

where $0 \leq H_s(X) \leq 1$. For a subset traffic share, X represents the subset; $x_i$ represents a specific subset; m represents total traffic volume associated with the network and m represents the traffic volume associated with the $i^{th}$ subset.

Ones of the standardized entropy values may include a value in a range from 0 to 1. The standardized entropy value is inversely related to the probability that one of the subsets is responsible for the anomalous network activity. For example, as a standardized entropy value increases, the probability that one of the subsets of network addresses initiated the anomalous network activity decreases.

Some embodiments may include determining the relative entropy of a distribution of traffic share (block 126). Determining a relative entropy may generate relative entropy values corresponding to the subsets of network addresses. The relative entropy values may correspond to a probability that the anomalous network activity is initiated by one of the subsets. In some embodiments, relative entropy values include relative entropy of distributions of traffic share between a current probability distribution observed in a recently measured time interval and a baseline probability distribution. The relative entropy values may correspond to a probability that one of the subsets initiated the anomalous network activity. Some embodiments provide that as a relative entropy value increases, a probability that one of the subsets initiated the anomalous network activity increases.

In some embodiments, the relative entropy $D(p\|q)$ between two probability distributions is given by:

$$D(p \| q) \sum_{x \in \chi} p(x) \log \frac{p(x)}{q(x)} \text{ where}$$

$$0 \log \frac{0}{q} = 0 \text{ and } p \log \frac{p}{0} = \infty.$$

Note that relative entropy is a non-negative number and $D(p\|q)=0$ iff $p=q$. As described herein, p is the current distribution of P subset traffic share (i.e., subset traffic share distribution observed at time t) and q is the baseline distribution of subset traffic share. For currently active subsets at time t, but that are not in the baseline, a low, but non-zero probability value may be assigned to these subsets in order to perform the metric computation. For example, if $x_i$ is a zone currently active at time t, but not in the baseline, then a baseline probability, $q(x_i)$ may be assigned as follows:

$$q(x_i) = \frac{\text{smallest\_q}}{\text{next\_to\_smallest\_q}} * \text{smallest\_q}$$

(i.e., this subset was not observed, but this may be the subset traffic share estimate). For purpose of metric calculation, q(x) may then be modified to take into account these new subsets.

Although described as separate metrics for identifying suspect subsets by detecting anomalies, the disclosed metrics may be used in combination with one another and an alert may be determined responsive to an alert generated via any one of the metrics.

In some embodiments, identifying a suspect subset may optionally include comparing determined values corresponding to the total network traffic volume, the standardized entropy and the relative entropy to predicted or threshold values of the total network traffic volume, the standardized entropy and the relative entropy (block 128). As a result of the comparisons, a total volume deviation score, a standardized entropy deviation score and a relative entropy deviation score may be determined for the subsets. In this manner, the metrics' observed values for time period t are compared to their predicted values for time period t.

A statistical significance corresponding to each of the total volume deviation score, the standardized entropy deviation score and the relative entropy deviation score for each of the subsets may be determined for time period t (block 131). A threshold crossing alert may be generated based on the determination that the deviation score is statistically significant (block 132). Some embodiments provide that an alert may be configured to include a date/time of the alert, an alert description, a baseline metric value and an determined and/or measured metric value. For example, the following table may provide an example of an alert according to some embodiments herein.

| Date | Alert Description | Zone(s) Baseline Share | Zone(s) Current Share |
|---|---|---|---|
| 20090824.10 | Change in current zone share distribution for zone type, attacker, and connection type, drop, attributable to several zones currently achieving traffic share higher than their baseline traffic share. Check following zones whose current traffic share is significantly greater than their baseline traffic share: ExampleNet 123.123.x.x | Zone(s) baseline share: ExampleNet 123.123.x.x:0.0008 | Zone(s) current share: ExampleNet 123.123.x.x:0.9590 |

In some embodiments, the specific implementation of the deviation score may be based on an adaptive thresholding approach. For example, if i is the interval of the cycle (i.e., hour of a 24-hour cycle), X is the observed traffic anomaly metric measurement for time period i, μ represents the current overall estimate of the mean and Var represents the current estimate of the overall variance, then the deviation score or measure of the deviation of X from its expected value, may be computed as follows:

$$D = \frac{X - S_i \mu}{\sqrt{S_i} \sqrt{Var}}$$

An alarm is generated if |D|>L, where L=alarm level.

Some embodiments provide that other approaches to calculating a deviation score could be implemented. For example, the seasonality component may be removed from the observed data to derive a time series without much variation that is therefore suitable for simple thresholding to identify unusual events. An arbitrary threshold of a specified number of standard deviations may be used for alerting.

In some embodiments, a measure of deviation may be applied that is a weighted average absolute deviation, updated via exponential smoothing. Thus, if $y_t$ is the observed measurement at time t, $\hat{y}_t$ is the predicted or expected value at time t, and ln denotes the period of the seasonal trend (e.g., the number of observations per day), then the measure of deviation at time t, $d_t$, is a weighted absolute deviation, updated via exponential smoothing, $d_t = \gamma |y_t - \hat{y}_t| + (1-\gamma)d_{t-m}$, where $0 < \gamma \le 1$ The confidence band is the collection of intervals, $(\hat{y}_t - \delta_- * d_{t-m}, \hat{y}_t + \delta_+ * d_{t-m})$ for each measurement $y_t$ in the time series where $\delta_+$ and $\delta_-$ are scaling factors for the width of the confidence band. Some embodiments provide that a simple mechanism to detect an anomaly is to determine whether an observed measurement falls outside the confidence band for time period t. Some embodiments provide that a moving window of a fixed number of observations may be applied so that if the number of observations that fall outside the confidence band exceeds a specific number, $c_0$, then an alert would be triggered.

Once a metric threshold crossing alert is generated, the metric may be displayed and/or transmitted together with subsets whose current observed traffic share is $\ge c_1$. Some embodiments provide that a determination may be made that the traffic share is significantly greater than a baseline traffic share by applying an odds ratio test. For these subsets, both their current and baseline traffic share may be presented in the alert.

The model parameter values for each of our time series and the subsets' baseline traffic share may be updated. If $y_t$ is an observed value at time t and $\hat{y}_t$ is the predicted value at time t, then model parameter values may be updated, by Exponential Weighted Moving Average, EWMA, as follows:

$$\hat{y}_{t+1} = \alpha * y_t + (1-\alpha) * \hat{y}_t, 0 \le \alpha \le 1.$$

Some embodiments provide that the model parameter values are updated by calculating new estimates (block 134). For example, if i is the interval of the cycle (i.e., hour of a 24-hour cycle), X is the observed traffic anomaly metric measurement for time period i, μ represents the current overall estimate of the mean and Var represents the current estimate of the overall variance, new estimates for these parameters may be calculated using the following equations:

$$\text{New } \mu = \alpha \theta \frac{X}{S_i} + (1 - \alpha \theta)\mu$$

$$\text{New } S_i = \beta \theta \frac{X}{\mu} + (1 - \beta \theta)S_i$$

$$\text{New Var} = \max\left(\gamma \theta S_i \left(\frac{X}{S_i} - \mu\right)^2 + (1 - \gamma \theta)\text{Var}, \text{Min}SD^2\right)$$

$i$ = interval of cycle $$0 < \alpha, \beta, \gamma < \frac{1}{\theta}, \text{Min}SD > 0(\text{minimum}SD)$$

At the end of each time period, model parameter values may be updated as follows:

μ:=New μ, $S_i$:=New $S_i$, Var:=New Var

Briefly referring back to FIG. 1, operations may include identifying a suspect subset of the subsets of network addresses that corresponds to anomalous network activity (block 130). Some embodiments provide identifying a suspect subset may include applying an odds ratio test to any alert crossing.

For example, given a threshold crossing alert at time t, subsets whose current observed traffic share is $\ge c_1$ are analyzed further using an odds ratio test to determine whether their current traffic share is significantly higher than their baseline traffic share. In some embodiments, the odds ratio may represent the odds of a subset having a higher current traffic volume at time t compared to their baseline traffic volume relative to the odds of all other subsets having a higher current traffic volume compared to their baseline traffic volume. In this regard, a subset odds ratio may be computed by the ratio of its current traffic volume (at time t) ("n11") divided by its baseline traffic volume at time t ("n12") to the residual current traffic volume at time t ("n21") divided by the residual baseline traffic volume at time t ("n22"), $$R = \frac{n11/n12}{n21/n22}.$$

Applying a logarithmic transformation to R for a given subset, if ln R=0, then the relationship between the current and baseline traffic for the subset is similar to the other IP address aggregates. If ln R>0, then the subset's current traffic is higher than its baseline traffic in comparison to other subsets. If ln R<0, then the subset's current traffic volume is lower than its baseline traffic volume in comparison to other subsets. Subsets whose odds ratio, R, >$c_2$ are further analyzed to identify their "heavy hitter" network address or source network address regarding the anomalous activity.

Figure 3A:
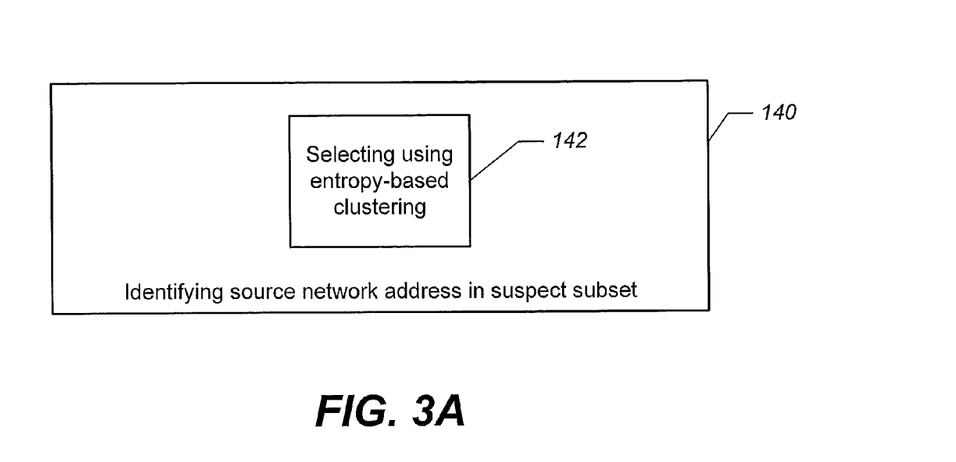
FIGS. 3A and 3B are block diagrams illustrating respective operations for identifying a source network address in a suspect subset of network addresses in a network according to some embodiments described herein.
Figure 3B:
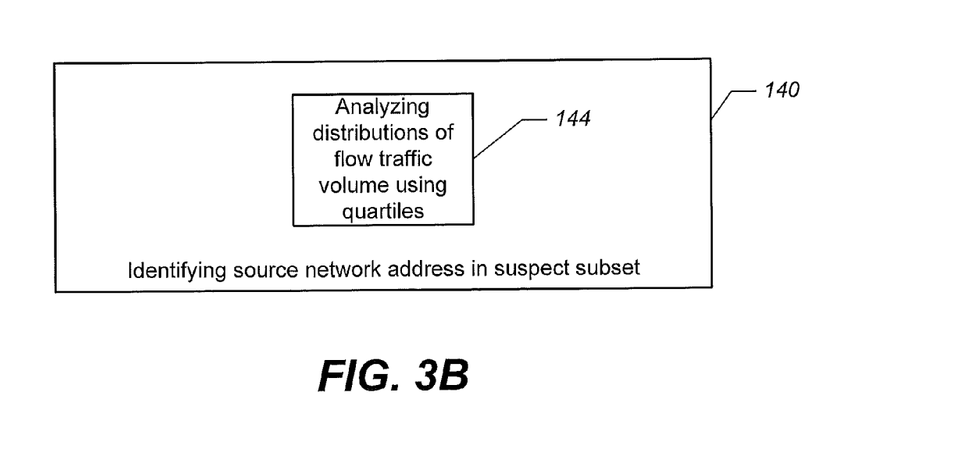

Operations may include identifying a source network address within the suspect subset of network addresses that corresponds to the anomalous network activity (block 140). Such operations are discussed in detail in reference to FIGS. 3A and 3B, are block diagrams illustrating respective operations for identifying a source network address in a suspect subset of network addresses in a network according to some embodiments described herein. Referring to FIG. 3A, identifying a source network address within the suspect subset may include selecting source network addresses using entropy-based clustering operations (block 142). In some embodiments, entropy-based cluster operations may be based on the suspect network address flow share being greater than a flow share threshold value.

An entropy-based component extraction operation may be applied to flows initiated by network addresses within a suspect subset to identify a source network address. When extracting a set of significant network addresses within flows associated with a subset, we may assume that the probability distribution of the possible values obeys a power law so that only a relatively few values have significantly larger probabilities while the remaining values are close to being uniformly distributed. In this regard, entropy-based clustering operation starts out with an initial threshold for selecting network addresses whose flow share $\alpha$ is greater than an initial threshold value, $\alpha_0$. For example, some exemplary embodiments include an initial threshold value $\alpha_0$ as being set to 0.02. As long as the standardized entropy of the remaining network addresses is less than a threshold, $\beta$ approximating a uniform distribution (e.g., $\beta$ may be set to 0.85 in the some embodiments), the algorithm examines each non-clustered network address to determine whether its flow share exceeds the flow share threshold value. If so, the network address is included in a set of significant network address values. This algorithm may reduce the threshold value $\alpha$ by an exponentially decreasing factor ($2^{-k}$) following each iteration k. The operation may terminate when the remaining non-clustered source network addresses have a probability distribution that is approximately uniform ($H_s > \beta$). Thus, network addresses within the resulting cluster are considered to represent "heavy-hitter" or source network addresses for that subset of network addresses. Exemplary pseudo-code for entropy-based clustering algorithms according to some embodiments herein is given in Table 1, as follows:

TABLE 1

| Pseudo-Code for Entropy-Based Clustering Algorithm |
| --- |
| 1  Parameters: $\alpha := \alpha_0$; $\beta := 0.85$; $S := \phi$ ; |
| 2  Initialization: $S := \phi$; $R := P$; $k := 0$ ; |
| 3  Compute $\theta := H_s(R)$ ; |
| 4  while $\theta \leq \beta$ do |
| 5      $\alpha = \alpha \times 2^{-k}$; $k++$; |
| 6      for each $p_i \in R$ do |
| 7          if $(prob_P(p_i) \geq \alpha$ then |
| 8              $S := S \cup \{p_i\}$; $R := R - \{p_i\}$; |
| 9          end if |
| 10     end for |
| 11     $\theta := H_s(R)$; |
| 12 end while |

In this regard, selecting source network addresses using entropy-based clustering procedures may include iteratively selecting source network addresses and reducing the flow share threshold value by an exponentially decreasing factor following each iteration. Brief reference is made to FIG. 6, which is a block diagram illustrating an example of an entropy-based cluster analysis and quartile analysis that identify a source network address corresponding to anomalous network activity. As illustrated, a source network address 242 is initiating a significantly high flow share of dropped connections relative to other network addresses in the subset 241. Some embodiments provide that source network addresses may be identified by flows sent to other addresses that were destination addresses.

Figure 6:
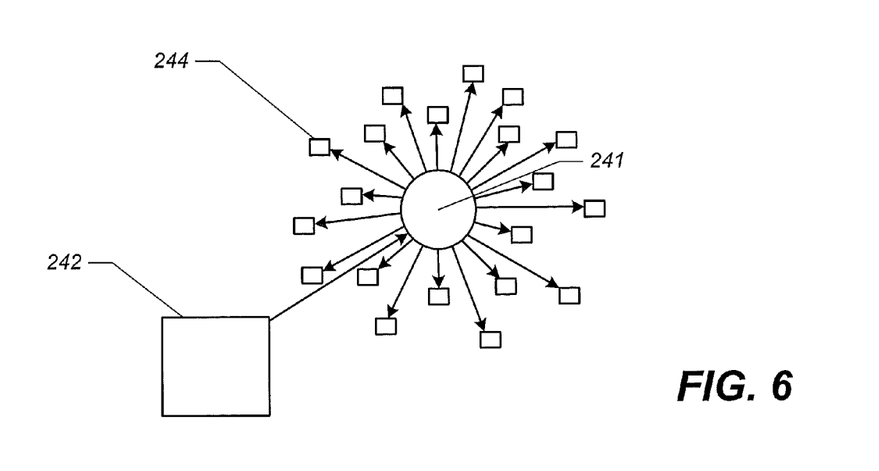
FIG. 6 is a block diagram illustrating an example of an entropy-based cluster analysis and quartile analysis that identify a source network address corresponding to anomalous network activity.

Referring now to FIG. 3B and FIG. 6, some embodiments provide that identifying a source network address may include analyzing distributions of flow traffic volume based on traffic flow volume quartiles (block 144). For example, the distribution of flows initiated by source network addresses within a subset at time t can be analyzed. In some embodiments, network addresses whose flow traffic volume exceeds, for example, Q3+$c_3$*(Q3−Q1), $c_3$>1.5 (where Q3 represents the third quartile and Q1 represents the first quartile) can be considered to be outlier observations and hence "heavy-hitter" or source network addresses for that subset. These network addresses may then be identified as likely malevolent IP hosts to a network security analyst.

Figure 4:
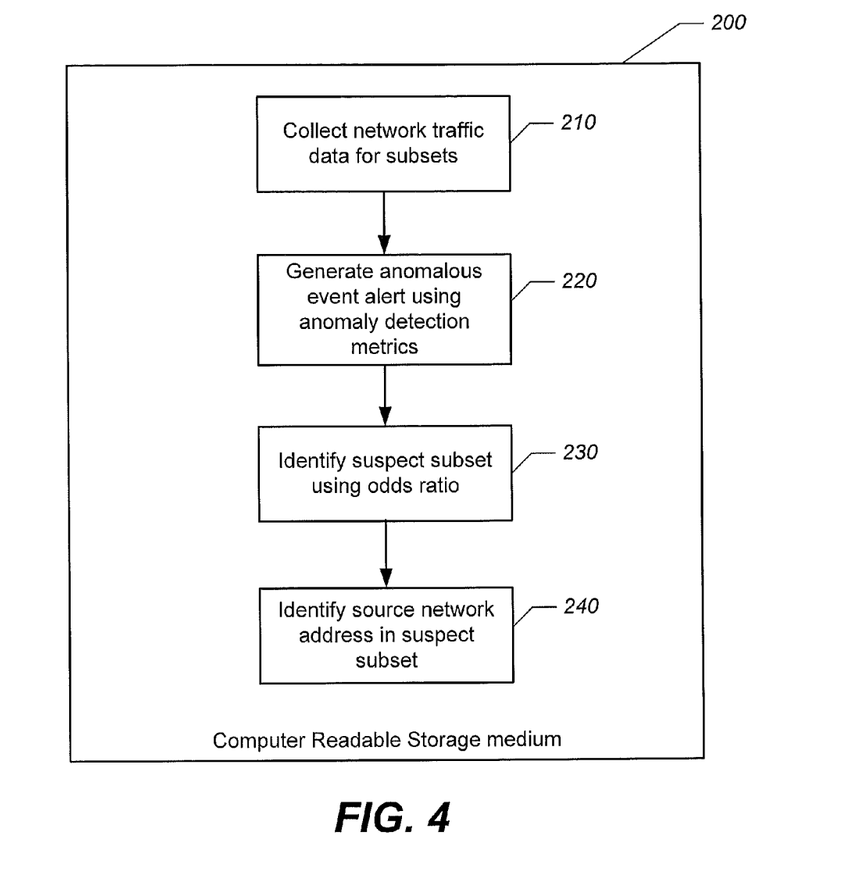
FIG. 4 is a block diagram illustrating computer readable storage medium for providing alerts in a network according to some embodiments described herein.

Reference is now made to FIG. 4, which is a block diagram illustrating computer readable storage medium for providing alerts in a network according to some embodiments described herein. The computer readable storage medium can include computer readable program code configured to perform operations corresponding to multiple subsets of network addresses in a network and/or supported by a network provider as discussed above regarding FIGS. 1, 2, 3A and 3B. For example, computer readable program code may be configured to collect network traffic data corresponding to the subsets (block 210). In some embodiments, alerts may be generated using one or more anomaly detection metrics that may be used collectively (block 220).

Some embodiments provide that computer readable program code may be configured to identify a suspect subset of the multiple subsets of network addresses that corresponds to anomalous network activity based on the network traffic data (block 230). The identification may be performed via alerts that may be generated using one or more anomaly detection metrics that may be used collectively. Computer readable program code may be configured to identify a source network address within the suspect subset of network addresses that corresponds to the anomalous network activity (block 240).

In some embodiments, program code that is configured to generate alerts may be operable to use multiple anomaly detection metrics cooperatively. For example, reference is made to FIG. 5, which is a block diagram illustrating computer readable storage medium for generating anomalous event alerts in a network according to some embodiments described herein. The anomaly detection metrics may include program code that is configured to estimate a total network traffic volume in the predefined time interval (block 222). Some embodiments provide that computer readable program code is configured to estimate a standardized entropy of a distribution of traffic share of the subsets of network addresses in the predefined time interval (block 224). Additionally, the computer readable program code may be configured to estimate a relative entropy of a distribution of traffic share of the subsets of network addresses in the predefined time interval (block 226).

Figure 5:
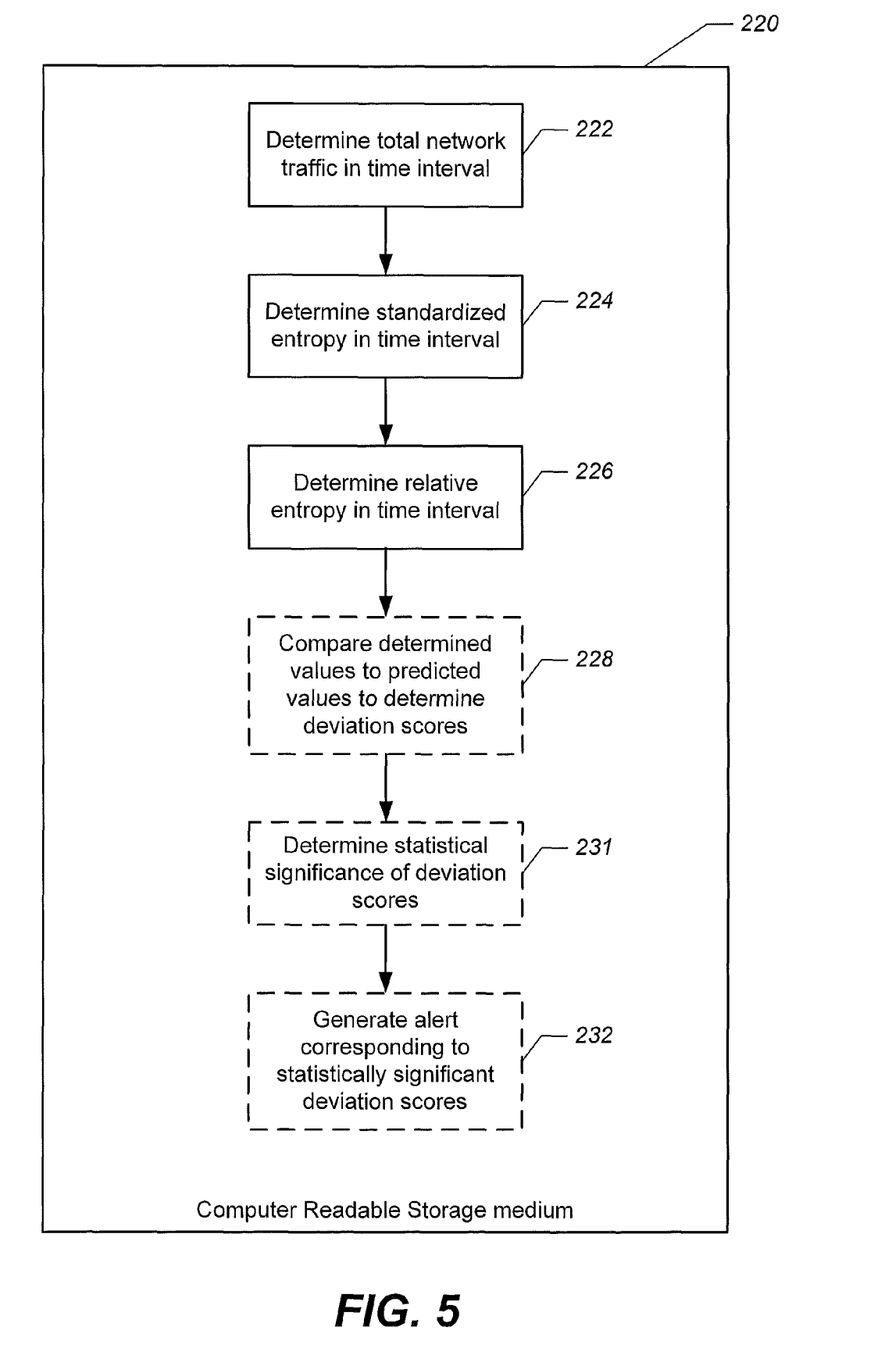
FIG. 5 is a block diagram illustrating computer readable storage medium for generating anomalous event alerts in a network in a network according to some embodiments described herein.

Some embodiments include computer readable program code that is configured, in each predefined time interval, to compare determined values corresponding to the total network traffic volume, the standardized entropy and the relative entropy to predicted values of the total network traffic volume, the standardized entropy and the relative entropy (block 228) that are determined for the subsets. In this manner, a total volume deviation score, a standardized entropy deviation score and a relative entropy deviation score may be determined. Program code may be further configured to determine a statistical significance corresponding to each of the total volume deviation score, the standardized entropy deviation score and the relative entropy deviation score for the subsets (block 231). Computer readable program code may be further configured to generate an alert responsive to determining that any of the total volume deviation score, the standardized entropy deviation score or the relative entropy deviation score is statistically significant (block 232).

Figure 7:
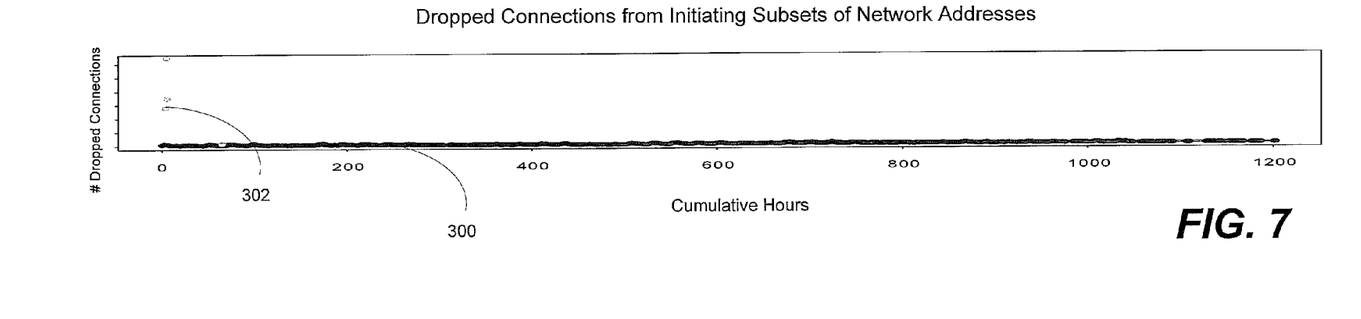
FIG. 7 is a graph illustrating a time series of a network traffic volume metric for providing alerts in a network using exemplary data according to some embodiments of the present invention.

Brief reference is now made to FIG. 7, which is a graph illustrating a time series of a network traffic volume metric for providing alerts in a network using exemplary data according to some embodiments of the present invention. As discussed above, total network traffic volume data may be analyzed using any of a variety of traffic metrics. For example, FIG. 7 illustrates the total number of dropped calls 300 over a cumulative period of hours. While the total number of dropped calls 300 from a subset of initiating network addresses per time unit remains relatively stable in most instances, in the case of an anomalously high number of dropped calls 302, an alert may be generated by the total network traffic volume metric. For example, some embodiments provide that the network traffic volume data may be compared to an expected threshold value. Note that the same metric may be generated corresponding to recipients of dropped connections, such data may be less interesting than that corresponding to the initiators of the dropped connections since the initiators are more likely to be the source of potentially malevolent network activity.

Figure 8:
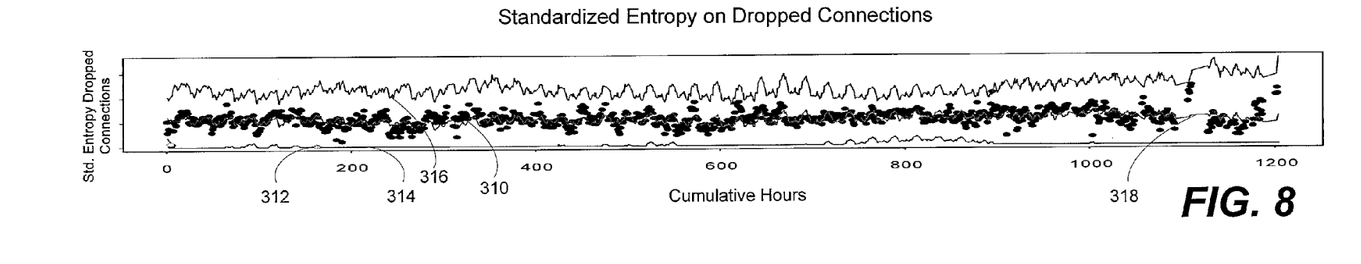
FIG. 8 is a graph illustrating a time series of a standardized entropy metric for providing alerts in a network using exemplary data according to some embodiments of the present invention.

Brief reference is now made to FIG. 8, which is a graph illustrating a time series of a standardized entropy metric for providing alerts in a network using exemplary data according to some embodiments of the present invention. As discussed above regarding FIG. 7, although a variety of data types may be used to generate the standardized entropy metric, FIG. 8 illustrates the standardized entropy values 310 corresponding to dropped connections. Generating an alert using standardized entropy may include determining estimated, computed and/or measured standardized entropy values 310 and comparing them to expected and/or threshold standardized entropy values 318 that may be measured, computed and/or estimated. Some embodiments provide that upper and/or lower confidence limits 316, 314 may be determined using the expected standardized entropy values 318. In this regard, an alert may be generated by an anomalous standardized entropy value 312 that falls outside the upper and/or lower confidence limits 316, 314. Note the standardized entropy values 310 illustrated in FIG. 8 are based on the same dropped connection data as used in FIG. 7 and that the standardized entropy metric generated an alert that the total network traffic volume did not detect.

Figure 9:
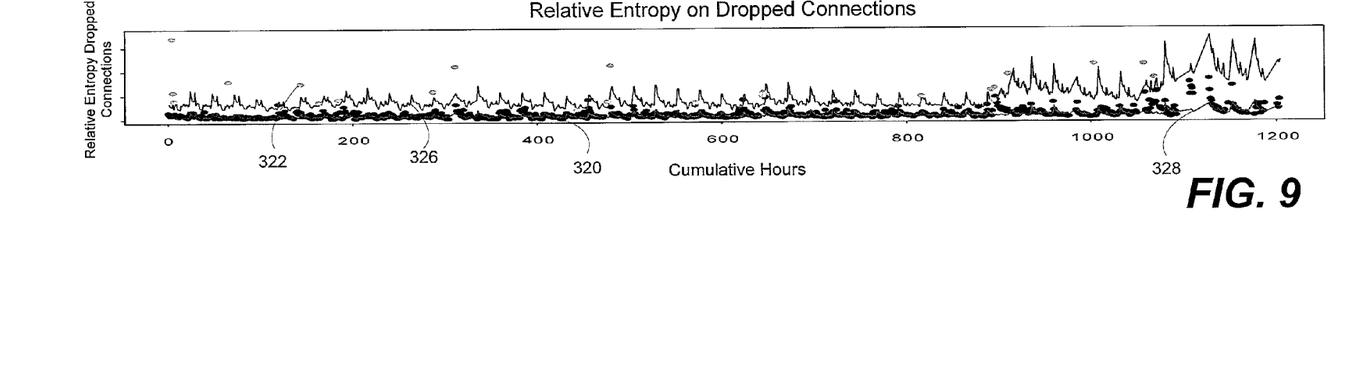
FIG. 9 is a graph illustrating a time series of a relative entropy metric for providing alerts in a network using exemplary data according to some embodiments of the present invention.

Brief reference is now made to FIG. 9, which is a graph illustrating a time series of a relative entropy metric for providing alerts in a network using exemplary data according to some embodiments of the present invention. Although a variety of data types may be used to generate the relative entropy metric, FIG. 9 illustrates the relative entropy values 320 corresponding to dropped connections using the same dropped connection data as used in FIGS. 7 and 8. Generating an alert using relative entropy may include determining estimated, computed and/or measured relative entropy values 320 and comparing them to expected and/or threshold relative entropy values 328. Some embodiments provide that an upper confidence limit 326 may be determined using the expected relative entropy values 328. In this regard, an alert may be generated by an anomalous relative entropy value 322 that exceeds the upper confidence limit 326. Note the relative entropy generated alerts that were undetected by the total network traffic volume and the standardized entropy metric. By using each of the three metrics cooperatively, actionable alerts for malevolent network addresses may be generated.

Figure 10:
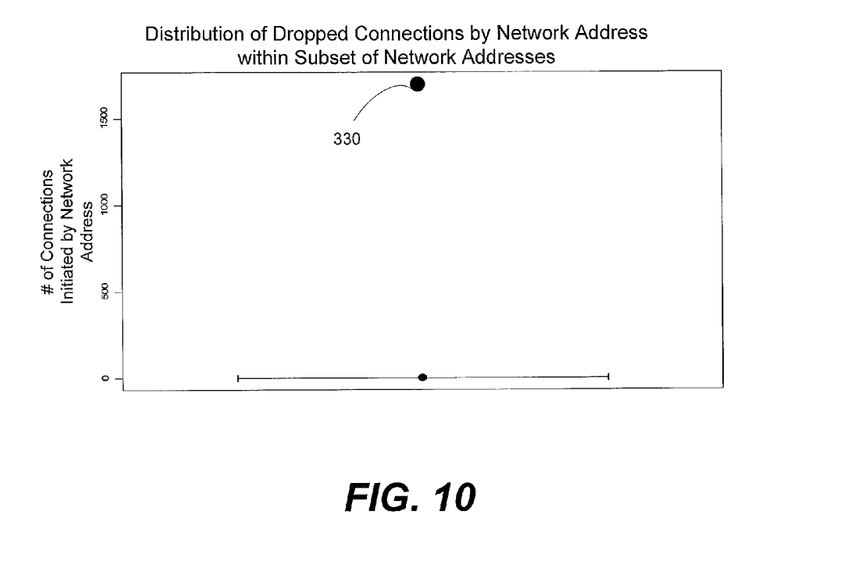
FIG. 10 is a graph illustrating a distribution of dropped connection by network address applied to network address traffic within a subset of network addresses.

Brief reference is now made to FIG. 10, which is a graph illustrating a distribution of dropped connection by network address applied to network address traffic within a subset of network addresses. Note that the distribution of dropped connections among network addresses within a subset of network addresses is substantially concentrated on a specific network address 330. In this manner, the heavy hitter network address may be identified.

Specific exemplary embodiments now will be described with reference to the accompanying drawings. Embodiments may include many different forms and should not be construed as limited as set forth herein; rather, these embodiments are provided so that this disclosure will be thorough and complete, and will fully convey the scope thereof to those skilled in the art. The terminology used in the detailed description of the particular exemplary embodiments illustrated in the accompanying drawings is not intended to be limiting. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items. As used herein, a "/" between ones of any plurality of terms is an inclusive alternative expression indicating that either or both of the terms may be applicable in the context thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

As will be appreciated by one of skill in the art, the present disclosure may be embodied as a method, system, or computer program product. Accordingly, the present disclosure may take the form of an entirely hardware embodiment, a software embodiment or an embodiment combining software and hardware aspects all generally referred to herein as a "circuit" or "module." Furthermore, the present disclosure may take the form of a computer program product comprising a computer-usable storage medium having computer-usable program code embodied in the medium. Any suitable computer readable medium may be utilized including hard disks, CD-ROMs, optical storage devices, or magnetic storage devices.

Computer program code for carrying out operations of the present disclosure may be written in an object oriented programming language such as Python, Java®, Smalltalk, PERL or C++. However, the computer program code for carrying out operations of the present disclosure may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present disclosure is described in part above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and schematic diagrams of the figures illustrate the architecture, functionality, and/or operations of some embodiments of methods, systems, devices and computer program products for protecting a computer network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments. Although specific terms are employed, they are used in a generic and descriptive sense only and not for purposes of limitation, the scope of the disclosure being defined by the following claims.

That which is claimed is:

1. A method for providing alerts in a network, the method comprising:
    collecting network traffic data corresponding to a plurality of subsets of network addresses during a predefined time interval;
    generating an event alert corresponding to anomalous network activity based on the network traffic and using the following anomaly detection metrics:
        determining a total network traffic volume in the predefined time interval;
        determining a standardized entropy of a distribution of traffic share of the plurality of subsets of network addresses in the predefined time interval; and
        determining a relative entropy of the distribution of traffic share of the plurality of subsets of network addresses in the predefined time interval relative to a baseline distribution of traffic share of respective ones of the plurality of subsets of network addresses;
    identifying a suspect subset of the plurality of subsets of network addresses that corresponds to anomalous network activity using an odds ratio test that determines whether traffic volume for the suspect subset at a given time is significantly higher than a baseline traffic volume for the suspect subset, and wherein the odds ratio represents odds of the suspect subset having a higher traffic volume at the given time compared to a baseline traffic volume relative to odds of all other ones of the plurality of subsets having higher traffic volumes compared to their respective baseline traffic volumes; and
    identifying a source network address within the suspect subset of network addresses that corresponds to the anomalous network activity.

2. The method according to claim 1,
    wherein generating the event alert using the at least one network traffic volume data metric comprises determining a network traffic volume data metric value from ones of the plurality of subsets of network addresses and identifying the suspect subset as having the network traffic volume data metric value that exceeds a predicted network traffic volume data metric value, and
    wherein the at least one network traffic volume data metric includes a metric selected from a group of metrics including dropped connections, network traffic flows, bytes of network traffic, packets of network traffic and established connections.

3. The method according to claim 1, wherein generating the event alert using the standardized entropy of the distribution of traffic share comprises determining a standardized entropy of at least one of a plurality of network traffic metrics that provides a standardized entropy value corresponding to the plurality of subsets of network addresses, the standardized entropy value corresponding to a probability that the anomalous network activity is initiated by one of the plurality of subsets.

4. The method according to claim 3, wherein the standardized entropy value includes a value in a range from 0 to 1 that corresponds to an increasing probability that one of the plurality of subsets of network addresses initiated the anomalous network activity as the standardized entropy values decreases.

5. The method according to claim 1, wherein generating the event alert using the relative entropy of the distribution of traffic share comprises determining a relative entropy of at least one of a plurality of network traffic metrics that provides a relative entropy value corresponding to the plurality of subsets of network addresses, the relative entropy value corresponding to a probability that the anomalous network activity is initiated by one of the plurality of subsets.

6. The method according to claim 5, wherein the relative entropy value includes a relative entropy of distributions of traffic share between a current probability distribution observed in a recently measured time interval and a baseline probability distribution that corresponds to a probability that one of the plurality of subsets of network addresses initiated the anomalous network activity.

7. The method according to claim 6, wherein as the relative entropy value increases, a probability that one of the plurality of subsets of network addresses initiated the anomalous network activity increases.

8. The method according to claim 1, wherein generating the event alert further comprises comparing determined values corresponding to the total network traffic volume, the standardized entropy and the relative entropy to baseline values of the total network traffic volume, the standardized entropy and the relative entropy to determine a total volume deviation score, a standardized entropy deviation score and a relative entropy deviation score.

9. The method according to claim 8, wherein generating the event alert further comprises:
  determining a statistical significance corresponding to each of the total volume deviation score, the standardized entropy deviation score and the relative entropy deviation score for the plurality of subsets of network addresses; and
  generating the alert corresponding to the plurality of subsets of network addresses responsive to determining that any of the total volume deviation score, the standardized entropy deviation score or the relative entropy deviation score is statistically significant.

10. The method according to claim 9, wherein identifying the source network address within the suspect subset of network addresses further comprises selecting source network addresses using entropy-based clustering procedures based on the source network address flow share being greater than a flow share threshold value.

11. The method according to claim 10, wherein selecting source network addresses using entropy-based clustering procedures comprises iteratively selecting source network addresses and reducing the flow share threshold value by an exponentially decreasing factor following each iteration.

12. The method according to claim 9, wherein identifying the source network address within the suspect subset of network addresses further comprises analyzing distributions of flow traffic volume based on traffic flow volume quartiles.

13. The method according to claim 1, wherein the network traffic data includes traffic volume, dropped network connections, passed through connections or network device related events.

14. The method according to claim 1, wherein the plurality of subsets of network addresses are mutually exclusive subsets that include at least one first size subset and at least one second size subset that is different from the first size subset.

15. A computer program product comprising:
  a tangible, non-transitory computer readable storage medium having computer readable program code embodied therein, the computer readable program code comprising:
  computer readable program code to collect network traffic data corresponding to a plurality of subsets of network addresses during a predefined time interval;
  computer readable program code to generate an anomalous event alert for the plurality of subsets of network addresses that corresponds to anomalous network activity based on the network traffic data and using the following anomaly detection metrics:
    determining a total network traffic volume in the predefined time interval; and
    determining a standardized entropy of a distribution of traffic share of the plurality of subsets of network addresses in the predefined time interval; and
    determining a relative entropy of the distribution of traffic share of the plurality of subsets of network addresses in the predefined time interval relative to a baseline distribution of traffic share of respective ones of the plurality of subsets of network addresses;
  computer readable program code to identify a suspect subset of the plurality of subsets of network addresses that corresponds to anomalous network activity using an odds ratio test that determines whether traffic volume for the suspect subset at a given time is significantly higher than a baseline traffic volume for the suspect subset, and wherein the odds ratio represents odds of the suspect subset having a higher traffic volume at the given time compared to a baseline traffic volume relative to odds of all other ones of the plurality of subsets having higher traffic volumes compared to their respective baseline traffic volumes; and
  computer readable program code to identify a source network address within the suspect subset of network addresses that corresponds to the anomalous network activity.

16. The computer program product according to claim 15, wherein the computer readable program code to generate the anomalous event alert further comprises:
  computer readable program code to compare determined values corresponding to the total network traffic volume, the standardized entropy and the relative entropy to predicted values of the total network traffic volume, the standardized entropy and the relative entropy to determine a total volume deviation score, a standardized entropy deviation score and a relative entropy deviation score;
  computer readable program code to determine a statistical significance corresponding to each of the total volume deviation score, the standardized entropy deviation score and the relative entropy deviation score for the plurality of subsets of network addresses; and
  computer readable program code to generate the alert for the plurality of subsets of network addresses responsive to determining that any of the total volume deviation score, the standardized entropy deviation score or the relative entropy deviation score is statistically significant.

* * * * *